US 11,588,654 B2

(12) United States Patent
Wan et al.

(10) Patent No.: US 11,588,654 B2
(45) Date of Patent: Feb. 21, 2023

(54) METHOD AND APPARATUS FOR OPERATING BLOCKCHAIN SYSTEM, DEVICE AND STORAGE MEDIUM

(71) Applicant: BEIJING BAIDU NETCOM SCIENCE TECHNOLOGY CO., LTD., Beijing (CN)

(72) Inventors: Chunhui Wan, Beijing (CN); Tong Jin, Beijing (CN); Zhimin Wei, Beijing (CN); Jiaxiang Liu, Beijing (CN); Lei Zhang, Beijing (CN); Bingxin Fan, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/662,072

(22) Filed: May 4, 2022

(65) Prior Publication Data
US 2022/0263670 A1   Aug. 18, 2022

(30) Foreign Application Priority Data
Jun. 11, 2021   (CN) .......................... 202110652756.4

(51) Int. Cl.
*H04L 9/00* (2022.01)
*G06F 9/455* (2018.01)
(Continued)

(52) U.S. Cl.
CPC ............ *H04L 9/50* (2022.05); *G06F 9/45558* (2013.01); *G06F 9/466* (2013.01); *G06F 9/547* (2013.01);
(Continued)

(58) Field of Classification Search
CPC . H04L 9/50; H04L 2209/463; H04L 2209/56; G06F 9/45558; G06F 9/466; G06F 9/547; G06F 2209/45595
See application file for complete search history.

(56) References Cited

U.S. PATENT DOCUMENTS 10,581,696 B2    3/2020  Shi et al.
2007/0294512 A1* 12/2007 Crutchfield ............. G06F 8/443
                                                   712/E9.033
(Continued)

FOREIGN PATENT DOCUMENTS

CN          1570812 A     1/2005
CN        108305170 A     7/2018
(Continued)

OTHER PUBLICATIONS

First Chinese Search Report, from The State Intellectual Property Office of People's Republic of China, issued to CN Application No. 202110652756.4, dated Aug. 16, 2021, 2 pages.
First Office Action, from The State Intellectual Property Office of People's Republic of China, issued to CN Application No. 202110652756.4, dated Aug. 20, 2021, 14 pages.
Supplemental Chinese Search Report, from The State Intellectual Property Office of People's Republic of China, issued to CN Application No. 202110652756.4, dated Sep. 2, 2021, 1 page.
(Continued)

*Primary Examiner* — Tuan C Dao
(74) *Attorney, Agent, or Firm* — Hunton Andrews Kurth LLP

(57) ABSTRACT

Provided are a method and apparatus for operating a blockchain system, a device and a storage medium. The method is described below. To-be-processed blockchain data is acquired through a kernel engine of a blockchain system. The to-be-processed blockchain data is processed through the kernel engine, and a kernel component interface provided by a component adaptor is called during the processing process of the to-be-processed blockchain data to call a kernel component.

14 Claims, 8 Drawing Sheets

(51) Int. Cl.
*G06F 9/46* (2006.01)
*G06F 9/54* (2006.01)

(52) U.S. Cl.
CPC .............. *G06F 2009/45595* (2013.01); *H04L 2209/463* (2013.01); *H04L 2209/56* (2013.01)

(56) References Cited

U.S. PATENT DOCUMENTS

| | | | |
|---|---|---|---|
| 2008/0148048 A1* | 6/2008 | Govil | G06F 21/53 |
| | | | 713/164 |
| 2011/0126205 A1* | 5/2011 | Gaist | G06F 21/554 |
| | | | 718/103 |
| 2017/0091467 A1 | 3/2017 | Pogorelik et al. | |
| 2018/0314539 A1 | 11/2018 | Vyas et al. | |
| 2019/0012197 A1* | 1/2019 | Memon | G06F 8/61 |
| 2019/0334716 A1* | 10/2019 | Kocsis | H04L 9/321 |
| 2020/0021569 A1* | 1/2020 | Simons | H04L 9/3239 |
| 2020/0394708 A1 | 12/2020 | Cella | |
| 2020/0412525 A1* | 12/2020 | Katsak | H04L 9/0637 |
| 2021/0243037 A1* | 8/2021 | Wang | H04L 9/0825 |

FOREIGN PATENT DOCUMENTS

| | | |
|---|---|---|
| CN | 109558115 A | 4/2019 |
| CN | 111858104 A | 10/2020 |
| CN | 111988432 A | 11/2020 |
| CN | 112039987 A | 12/2020 |

OTHER PUBLICATIONS

Scheid, E., et al., Toward a Policy-based Blockchain Agnostic Framework, Communication Systems Group CSG, Department of Informatics Ifl, University of Zurich UZH, (2019) pp. 609-613, 5 pages.

Liu, M., et al., Distributed Trusted Network Connection Architecture Based on Blockchain, Journal of Software, (2019) 30(8), pp. 2314-2336, 23 pages.

Adapter, Design Patters / Structural Patterns, Sep. 16, 2022, 12 pages. (Retrieved from the Internet: URL:https://web.archive.org/web/2019040613 0050/https://refactoring.guru/design-patterns/adapter [retrieved on Sep. 16, 2022]).

Extended European Search Report issued from the European Patent Office to EP Application No. 22169320.3 dated Sep. 23, 2022, 9 pages.

Factory Method, Design Patterns / Creational Patterns, Sep. 16, 2022, 11 pages. (Retrieved from the Internet: URL:https://web.archive.org/web/20180805141258/https://refactoring.guru/design-patterns/factory-method [retrieved on Sep. 16, 2022]).

Korean Office Action, Korean Intellectual Property Office of People's Republic of China, issued to KR Application Mo 10-2022-0054812 dated Sep. 29, 2022, 5 pages.

Template Method, Design Patterns / Behavioral Patterns, Sep. 16, 2022, 7 pages. (Retrieved from the Internet: URL:https://web.archive.org/web/20180407105105/https://refactoring.guru/design-patterns/template-method [retrieved on Sep. 16, 2022]).

* cited by examiner

METHOD AND APPARATUS FOR OPERATING BLOCKCHAIN SYSTEM, DEVICE AND STORAGE MEDIUM

CROSS-REFERENCE TO RELATED APPLICATION(S)

This application claims priority to Chinese Patent Application No. 202110652756.4 filed Jun. 11, 2021, the disclosure of which is incorporated herein by reference in its entirety.

TECHNICAL FIELD

The present disclosure relates to the field of computer technologies and, in particular, the blockchain technology.

BACKGROUND

The blockchain industry continues to develop rapidly, and main application scenes of the blockchain technology in early stages of development are still focused on digital currencies and games. At present, the blockchain technology has entered a new stage of comprehensively exploring and empowering the industry from serving as the underlying technology that supports digital currencies.

At present, the mainstream blockchain implementation schemes have clear application scenes. Most of the conventional schemes are oriented to application scenes of digital currencies, and thus they are more suitable for the application of digital currencies. Therefore, in actual business scenes, the conventional schemes will encounter problems in applicability, the solution of which requires in-depth reconstruction on the framework based on. This reconstruction needs high costs and technical thresholds.

However, the manner of in-depth reconstruction on the framework makes the reconstruction difficult and costly, and after the reconstruction, the latest update corresponding to the framework cannot be automatically followed up.

SUMMARY

The present disclosure provides a method and apparatus for operating a blockchain system, a device and a storage medium, so as to improve the applicability of the blockchain to different scenes and reduce the development difficulty and cost.

According to an aspect of the present disclosure, a method for operating a blockchain system is provided. The method includes steps described below.

To-be-processed blockchain data is acquired through a kernel engine of the blockchain system.

The to-be-processed blockchain data is processed through the kernel engine, and a kernel component interface provided by a component adaptor is called during a processing process of the to-be-processed blockchain data to call a kernel component.

According to another aspect of the present disclosure, an apparatus for operating a blockchain system is provided. The apparatus includes a to-be-processed blockchain data acquisition module and a to-be-processed blockchain data processing module.

The to-be-processed blockchain data acquisition module is configured to acquire, through a kernel engine of the blockchain system, to-be-processed blockchain data.

The to-be-processed blockchain data processing module is configured to process, through the kernel engine, the to-be-processed blockchain data, and call a kernel component interface provided by a component adaptor during the processing process of the to-be-processed blockchain data to call a kernel component.

According to another aspect of the present disclosure, an electronic device is provided. The electronic device includes at least one processor and a memory communicatively connected to the at least one processor.

The memory stores instructions executable by the at least one processor to cause the at least one processor to perform the method for operating a blockchain system of any one of embodiments of the present disclosure.

According to another aspect of the present disclosure, a non-transitory computer-readable storage medium is further provided. The non-transitory computer-readable storage medium stores computer instructions for causing a computer to perform the method for operating a blockchain system according to any one of the embodiments of the present disclosure.

According to another aspect of the present disclosure, a computer program product is provided. The computer program product includes a computer program which, when executed by a processor, implements the method for operating a blockchain system of any one of the embodiments of the present disclosure.

According to the technical solution of the embodiments of the present disclosure, the extensibility and applicability of the blockchain implementation scheme can be improved, the business scenes where the blockchain system is applied to can be switched by performing reconstruction without code invasion on the blockchain system, and thereby the development cost of the blockchain technology is reduced.

It is to be understood that the content described in this part is neither intended to identify key or important features of the embodiments of the present disclosure nor intended to limit the scope of the present disclosure. Other features of the present disclosure are apparent from the description provided hereinafter.

BRIEF DESCRIPTION OF DRAWINGS

The drawings are intended to provide a better understanding of the present solution and not to limit the present disclosure.

DETAILED DESCRIPTION

Figure 1:
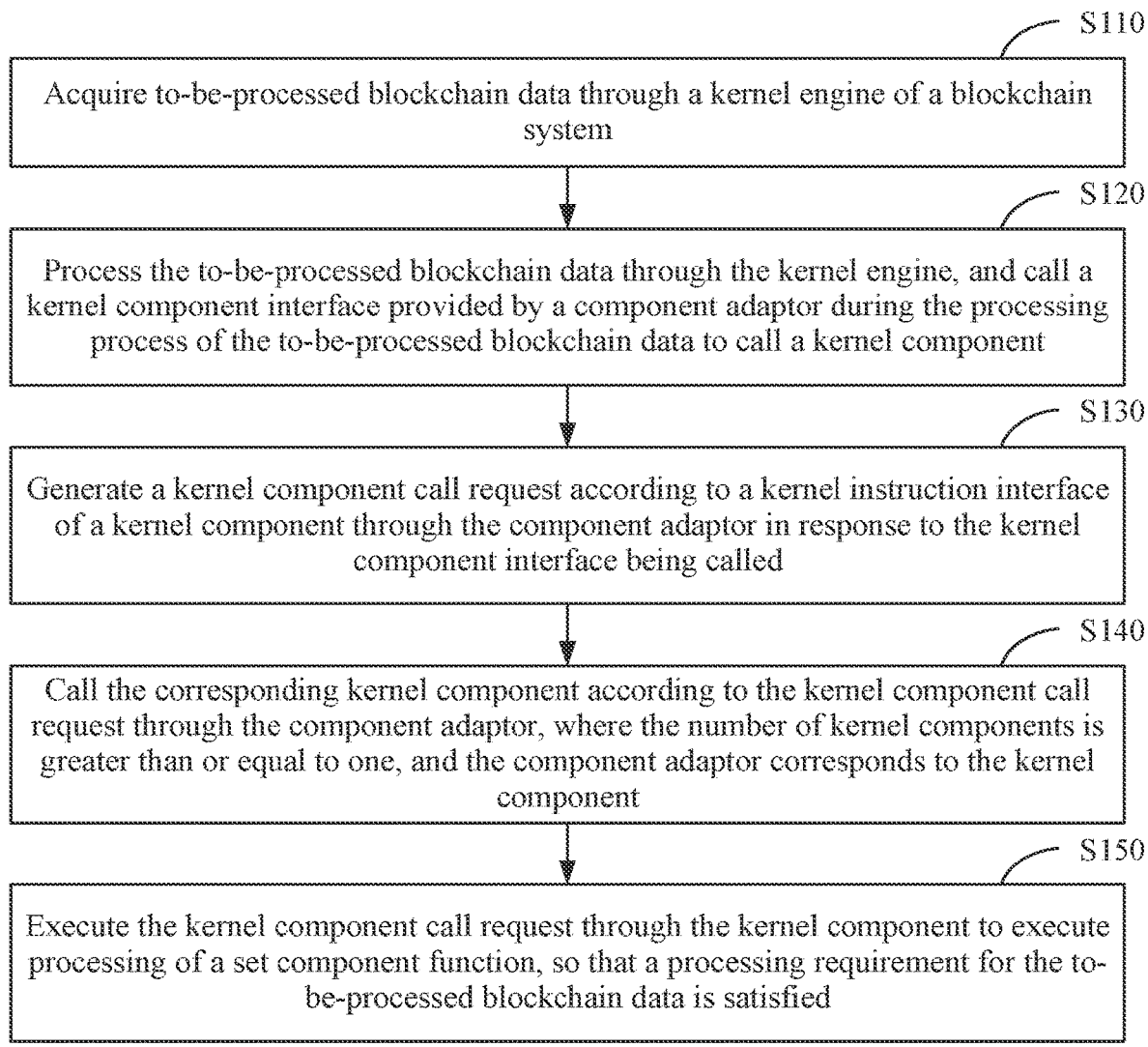
FIG. 1 is a diagram showing a method for operating a blockchain system according to an embodiment of the present disclosure.

Example embodiments of the present disclosure, including details of embodiments of the present disclosure, are described hereinafter in conjunction with the drawings to facilitate understanding. The example embodiments are merely illustrative. Therefore, it will be appreciated by those having ordinary skill in the art that various changes and modifications may be made to the embodiments described herein without departing from the scope and spirit of the present disclosure. Similarly, description of well-known functions and constructions is omitted hereinafter for clarity and conciseness.

The method for operating a blockchain system provided by the embodiments of the present disclosure is provided on the basis of the blockchain kernel architecture constructed by the inventor.

A blockchain system as a whole may be divided into two parts, that is, the blockchain kernel architecture and the blockchain application layer, respectively. The blockchain application layer is for users to implement specific business requirements based on the blockchain system, and the blockchain application layer shields users from the complex blockchain underlying technology, so that a blockchain can be built to satisfy the business requirements as long as the users understand the basic principles of the blockchain. The server function of the blockchain application layer may be implemented by main programs of the blockchain system. The blockchain application layer may further include a client and an application programming interface (API) to provide a user interaction interface or interaction mechanism, so as to achieve interaction with the users. In a blockchain system, the business function of one or more blockchain application layers may be supported. The client or API of the application layer may interact with the blockchain kernel architecture through proprietary components. The proprietary components, for example, implement monitoring services for set interaction ports.

The present disclosure pays more attention to the kernel architecture of the blockchain. The kernel architecture includes at least a kernel engine layer and a kernel component layer, and kernel architecture may further include a basic component layer. The kernel engine layer defines core flows of the blockchain kernel, that is, core flows of various kinds of business logic in the operation process of the blockchain, such as a deal processing flow, a miner block generation flow and a block synchronization flow. In the embodiments of the present disclosure, the so-called deal is a transaction request initiated by a blockchain user needing to be processed by a blockchain node based on the blockchain system, and the processing process is stored on chain. The transaction request is not limited to the deal business, and may be any application business required to be carried by the blockchain or any blockchain management transaction request. The so-called miner is a blockchain node that has the permission to generate blocks in a current block generation period and is not limited to the block generation node determined based on a proof of work (POW) consensus mechanism. Block generation nodes determined based on other consensus mechanisms may also be referred to as miners. In addition, the kernel engine uses a read/write splitting design to reduce complexity, and may use independent-read components to implement read operations, enabling read operations to be individually extended. The kernel engine in the kernel engine layer may be extended and customized without invasion of framework codes or may be adjusted and customized based on lightweight codes by users according to scene requirements. That is, developers may develop the kernel engine based on the function of kernel components, without developing the kernel components separately. Based on the kernel architecture, the possibility to configure multiple types of kernel engine layers is provided for users. Specifically, a super public chain engine (xuperos engine), a super alliance chain engine (xchain engine), a user-implemented kernel engine (other engines) and the like may be configured and developed.

The kernel component layer is the specific implementation of a kernel component programming specification with the implementation of very complete built-in standard kernel components, including a ledger component, a consensus component, a contract component, a network component, an encryption component, a permission component and the like for developers of the kernel engine to select. At the same time, the developers may develop kernel components suitable for scenes of the developers according to the kernel component programming specification at low cost, and seamlessly integrate the self-implemented kernel components into various kernel engines. The kernel component programming specification is a specification for abstracting kernel components. Kernel components are implemented according to the kernel component programming specification, so that a standard kernel component function interface may be provided for the kernel engine to call the kernel components, and thus the kernel engine can implement the call of the kernel components through the kernel component interface determined by a component adaptor (such as a consensus component adaptor, a contract component adaptor, a ledger component adaptor, a network component adaptor or a permission component adaptor) in the kernel engine layer, and then the processing of to-be-processed blockchain data is completed through the kernel components. The kernel component interface may also be referred to as a kernel function interface, which is a function-level interface that the kernel components provide for the kernel engine to call. No matter what kind of kernel component it is, no matter how the function of the component is implemented internally, a normalized and unified kernel component interface may be provided to facilitate the call by the kernel engine.

The basic component layer is provided with basic public components that have nothing to do with the blockchain business, such as: a basic storage, a peer-to-peer (p2p) network library, a cryptography library, a codec library and a log library.

The blockchain kernel architecture provided by the present disclosure is a brand-new, highly extendable and universal blockchain kernel framework applicable to wide-area scenes. The highly-modular design of this architecture ensures the loose coupling between modules, so that each module may be freely extended and replaced. Based on this architecture, users may develop a specific blockchain system with a very light weight according to requirements and preferences of a specific scene. According to this architecture, the difficulty of developing the blockchain system is reduced to that only part subdomain functions are extended according to scene requirements, so that the development cost of the blockchain technology is greatly reduced.

FIG. 1 is a diagram showing a method for operating a blockchain system according to an embodiment of the present disclosure. The embodiment is applicable to the case where to-be-processed blockchain data is processed by using a blockchain. The method for operating a blockchain system disclosed by the embodiment may be executed by an apparatus for operating a blockchain system. The apparatus may be implemented by software and/or hardware and configured in an electronic device having calculation and storage functions, for example, may be configured at a blockchain node.

Referring to FIG. 1, the method for operating a blockchain system provided by the embodiment includes steps described below.

In step S110, to-be-processed blockchain data is acquired through a kernel engine of a blockchain system.

The kernel engine represents a core flow of the blockchain kernel. The to-be-processed blockchain data acquired by the kernel engine may be sent by the upper layer of the kernel engine, that is, the application layer, to the kernel engine after the application layer acquires the to-be-processed blockchain data from a user client. Alternatively, the to-be-processed blockchain data acquired by the kernel engine may be to-be-processed blockchain data sent by the user client and received by the kernel engine through network components, or may be to-be-processed blockchain data formed by a blockchain system operation process, for example, a newly-generated block verification process and a block synchronization process, and received by the kernel engine through the network components.

The to-be-processed blockchain data refers to data needing to be processed by a blockchain node. Exemplarily, the to-be-processed blockchain data may further include governance data, that is, operation data for managing a network, specifically, operation data for changing a block generation node, managing a node and monitoring a network state. The to-be-processed blockchain data may also be a query request by a user for data in the blockchain and received by the kernel engine and a processing result of the processing process of the to-be-processed blockchain data fed back by the kernel component. The specific content of the to-be-processed blockchain data is not limited here, and is determined specifically according to actual situations.

In step S120, the to-be-processed blockchain data is processed through the kernel engine, and a kernel component interface provided by a component adaptor is called during the processing process to call a kernel component.

After acquiring the to-be-processed blockchain data, the kernel engine processes the to-be-processed blockchain data. Specifically, in the processing process, the kernel engine determines a kernel component interface for processing the to-be-processed blockchain data from kernel component interfaces provided by the component adaptor. The process of the kernel engine processing the to-be-processed blockchain data is essentially a process of selecting a kernel component having the corresponding function according to the to-be-processed blockchain data.

The kernel component interface achieves the abstraction of the achievable function of the kernel component, each kernel component in the blockchain system has a corresponding kernel component interface, and one kernel component interface may correspond to multiple kernel components. The kernel component interface is provided by the component adaptor for the kernel engine, and the kernel engine only needs to select the required kernel component function according to the to-be-processed blockchain data, and does not need to concern about the specific implementation of the kernel component function. The kernel engine may call the kernel component by calling the kernel component interface.

The component adaptor is configured at the kernel engine layer. The component adaptor serves as a translator and is configured to abstract the function of each kernel component into a kernel component interface which can be directly called by the kernel engine, and the component adaptor shields the kernel engine from the implementation details of the function of the kernel component. No matter what kind of kernel component it is, no matter how the component function is implemented internally, the kernel component interface abstracted by the component adaptor and provided for the kernel engine is a normalized interface. In this way, a loose coupling relationship between the kernel engine and the kernel component is maintained, so that both the kernel engine and the kernel component can be freely extended and replaced.

Exemplarily, a miner thread in the kernel engine may call a consensus component by calling the CompeteMaster interface to monitor whether a native node is a current-height miner. The CompeteMaster interface is a consensus component interface provided by the component adaptor for the kernel engine for checking a specified-height miner. The component adaptor will instantiate the corresponding consensus component according to the current consensus type (such as the POW type), and then call the CompeteMaster interface of the component to complete the calculation of the current-height miner.

In an optional embodiment, after the kernel component interface provided by the component adaptor is called during the processing process, the method further specifically includes steps S130 to S150 described below, that is, the process of the component adaptor specifically implementing the call of the kernel component.

In step S130, a kernel component call request is generated according to a kernel instruction interface of a kernel component through the component adaptor in response to the kernel component interface being called.

The kernel engine determines the required kernel component interface from kernel component interfaces provided by the component adaptor according to the to-be-processed blockchain data, and generates a kernel component call request according to a kernel instruction interface of the kernel component through the component adaptor when the kernel component interface is called.

Since the differences between the instruction system of the kernel engine and the instruction system of the kernel component may lead to the case that the form of the kernel call instruction of the kernel engine cannot be directly recognized and processed by the kernel component, the kernel instruction interface is introduced into the component adaptor. When the kernel engine calls the kernel component interface, the component adaptor determines the kernel instruction interface corresponding to the kernel component interface according to the called kernel component interface. A kernel component call instruction sent by the kernel engine is processed through the kernel instruction interface, and the kernel component call instruction is converted into an instruction form which can be directly executed by the kernel component.

The kernel component interface is mainly oriented to the kernel engine and provides a normalized call interface for the kernel engine. Different from the kernel component interface, the kernel instruction interface is oriented to the kernel component, and in the case where the kernel engine calls the kernel component, converts the kernel component call instruction into an instruction form recognizable by the corresponding kernel component.

The kernel engine generates the kernel component call request according to the kernel component interface and the to-be-processed blockchain data, and then converts the kernel component call request into an instruction-level call request which can be directly recognized by the corresponding component through the kernel instruction interface in the component adaptor. Optionally, the kernel component call request includes: a kernel component name, an input parameter, a requirement return parameter, a callback function, etc.

In step S140, the kernel component corresponding to the kernel component call request is called according to the kernel component call request through the component adaptor, where at least one kernel component is provided, and the component adaptor corresponds to the kernel component.

The component adaptor calls the corresponding kernel component according to the kernel component call request obtained through the conversion of the kernel instruction interface, so that the kernel component executes the processing of a set component function after receiving the kernel component call request.

At least one kernel component is provided. Exemplarily, the kernel component may include at least one of a consensus component, a ledger component, a contract component or a network component, and is generally a component dedicated to the blockchain operation function. The types and number of kernel components are not limited herein, and are determined according to actual situations. The kernel component may be constrained by a blockchain kernel component programming specification, and as long as the kernel component is developed following the blockchain kernel component programming specification, the kernel component may be called by the kernel engine. Therefore, kernel components satisfying various requirements may be developed to be dynamically selected and called during the blockchain development. According to the technical solution of the embodiment of the present disclosure, kernel components are formed by abstracting blockchain core functions such as a consensus function, a ledger function, a contract function, so that each kernel component may be freely extended and replaced without code invasion, and the customization of the kernel engine becomes lightweight. The programming specification defining each pluggable kernel component may generally include: the context, an external exposure interface, a driver constraint interface, a public data structure and the like. The implementation logic of the kernel component is implemented by a specific driver. Each kernel component driver is loaded in an init initialization registration manner, and component registration is automatically completed when a specific application program imports a corresponding kernel component package.

Optionally, in the blockchain system of the embodiment of the present disclosure, a kernel component may have a corresponding component adaptor. Exemplarily, the component adaptor may include: the component adaptor such as the consensus component adaptor corresponding to the consensus component, the contract component adaptor corresponding to the contract component, the network component adaptor corresponding to the network component and the permission component adaptor corresponding to the permission component. Some components may also be provided with no component adaptor according to the situation.

In step S150, the kernel component call request is executed through the kernel component to execute processing of a set component function, so that a processing requirement for the to-be-processed blockchain data is satisfied.

After receiving the kernel component call request, the kernel component directly executes the kernel component call request according to various parameters in the kernel component call request, such as the input parameter, the callback function and the requirement return parameter, so as to complete the processing requirement for the to-be-processed blockchain data. The set component function is related to the processing requirement for the to-be-processed blockchain data.

According to the technical solution of the embodiment of the present disclosure, the kernel engine cooperates with the kernel component, so that the processing requirement for the to-be-processed blockchain data is satisfied. In the present disclosure, both the kernel engine and the kernel component use a modular design, and the kernel engine and the kernel component cooperate to work through the component adaptor so as to achieve loose coupling between modules. The component adaptor provides the kernel component interface for the kernel engine to enable the kernel engine to select the kernel component according to requirements. On the other hand, the component adaptor converts, through the kernel instruction interface, the kernel component call instruction of the kernel engine and the to-be-processed blockchain data into a form that can be recognized by the kernel component. The component adaptor is introduced, so that both the kernel engine and the kernel component can be freely extended, and thereby the scene applicability of the blockchain system is extended. The method for operating a blockchain system provided by the present disclosure reduces the difficulty of developing the blockchain system to the extent that users only need to extend the function of the kernel component or the kernel engine according to scene requirements, thus greatly reducing the development cost of the blockchain technology.

Figure 2:
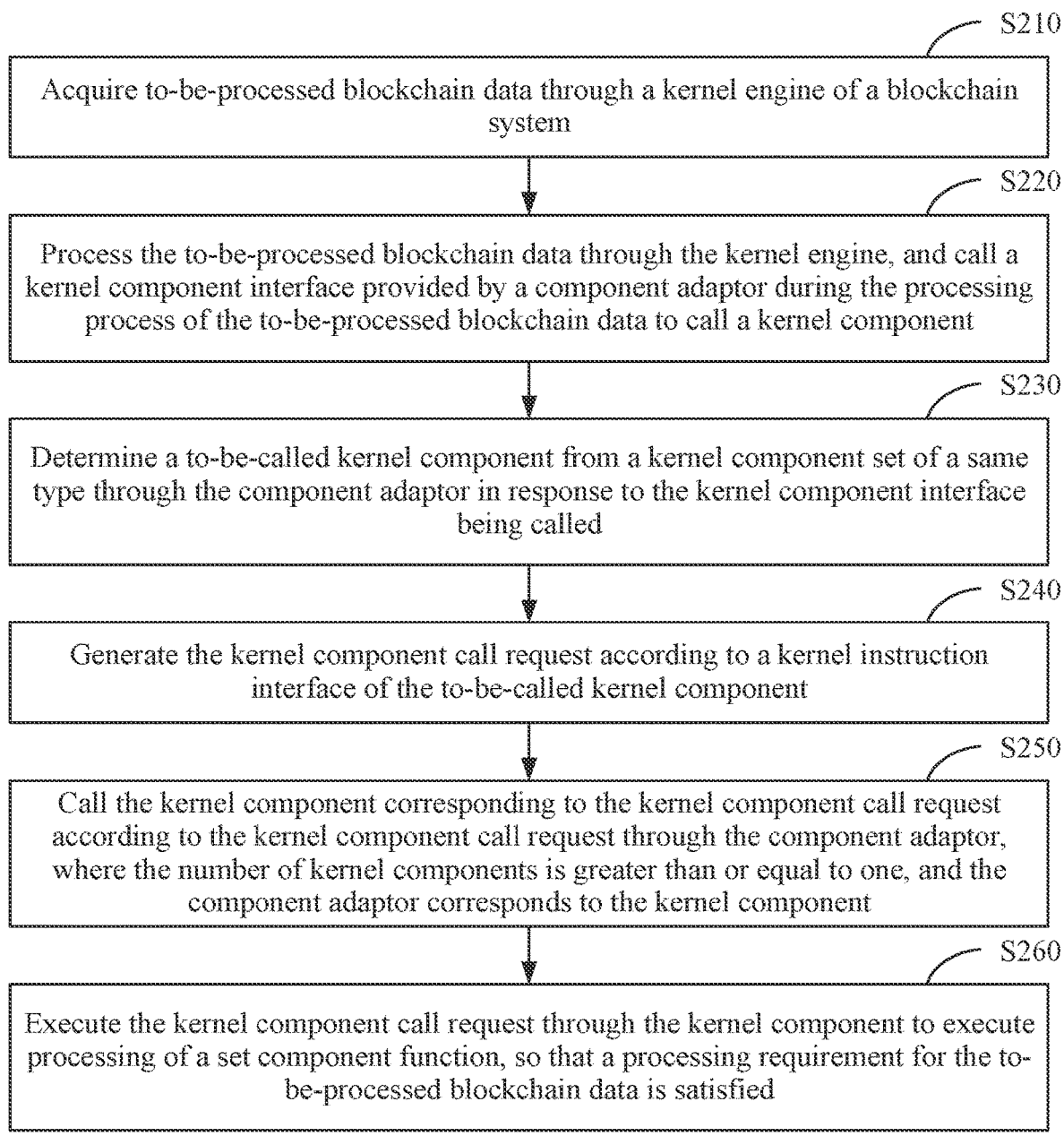
FIG. 2 is a diagram showing another method for operating a blockchain system according to an embodiment of the present disclosure.

FIG. 2 is a diagram showing another method for operating a blockchain system according to an embodiment of the present disclosure. This embodiment is an optional solution provided based on the preceding embodiment. Specifically, the step is refined in which the kernel component call request is generated according to the kernel instruction interface of the kernel component through the component adaptor in response to the kernel component interface being called.

Referring to FIG. 2, the method for operating a blockchain system provided by the embodiment includes steps described below.

In step S210, to-be-processed blockchain data is acquired through a kernel engine of a blockchain system.

In step S220, the to-be-processed blockchain data is processed through the kernel engine, and a kernel component interface provided by a component adaptor is called during the processing process to call a kernel component.

In step S230, a to-be-called kernel component is determined from a kernel component set of a same type through the component adaptor in response to the kernel component interface being called.

Due to different requirements for development languages and blockchain system performance, the requirements for kernel components are different in different landing scenes. When the kernel engine calls the kernel component through the kernel component call interface, the component adaptor also needs to determine a to-be-called kernel component from a kernel component set of a same type according to specific user requirements, that is, needs to select a kernel component belonging to a subtype from a broad type of functions.

In the embodiment of the present disclosure, kernel components are mainly classified according to functions, and specifically, kernel components may be divided into contract components, network components, consensus components and the like in terms of the achievable functions. The kernel component set of each type may further include multiple kernel components belonging to different subtypes in combination with application scenes of kernel components and characteristics of kernel component.

To extend application scenes of the blockchain system and reduce the difficulty of developing the blockchain by users, in the embodiment of the present disclosure, as for the key core components such as the contract component, the network component and the consensus component of the blockchain system, the implementation of complete built-in standard kernel components in the blockchain system is provided for users to select, so as to satisfy personalized requirements of the users.

In an optional embodiment, sets of kernel components of a same type include at least one of a contract component set, a network component set or a consensus component set. Types of contract components include a native code contract virtual machine, a web bytecode contract virtual machine or an Ethereum contract virtual machine. Types of network components include a peer-to-peer network. Types of consensus components include a single consensus component, a proof of work (POW) consensus component, an XPOS consensus component or an XPOA consensus component.

When the blockchain system is developed, developers may complete type selection configuration of kernel components according to scene requirements, and register the configuration information into the component adaptor. Then, when the kernel engine calls a kernel component, the component adaptor may determine the kernel component of a specific selected-type according to pre-configuration. Exemplarily, in the case of an oriented-to-public-network scene who is more focused on decentralization and security, the consensus mechanism of Byzantine fault tolerance (BFT) is required. The component adaptor may select the POW consensus component among the single consensus component, the POW consensus component, the XPOS consensus component or the XPOA consensus component as the consensus mechanism of the blockchain system. Of course, during the operation process of the blockchain, the manager of the blockchain may also change the configuration information in the component adaptor according to requirements, thereby controlling the operation of the blockchain. XPOS and XPOA are respectively the proof of authority (POA) consensus and the proof of stake (POS) consensus supported by XuperChain.

To enable users to achieve a type selection of kernel components according to requirements of the users, in an optional embodiment, the step in which the to-be-called kernel component is determined from the kernel component set of the same type through the component adaptor in response to the kernel component interface being called include the step described below. The to-be-called kernel component is determined from the kernel component set of the same type according to a kernel component configuration parameter deployed in a blockchain through the component adaptor in response to the kernel component interface being called, where the kernel component configuration parameter includes a kernel component type selection. When the blockchain is deployed, that is, when the blockchain is developed or created, the configuration by the manager is allowed.

The kernel component configuration parameter is pre-configured in the component adaptor by a user according to application scenes and business requirements of the blockchain system during the deployment process of the blockchain, and the configuration parameter includes the kernel component type selection. The kernel component type selection refers to type information of the kernel component expected to be selected by the user. When the kernel component is called, the component adaptor completes the work of determining the to-be-called kernel component from the kernel component set of the same type according to the configuration parameter of the kernel component.

In step S240, the kernel component call request is generated according to a kernel instruction interface of the to-be-called kernel component.

In step S250, the corresponding kernel component is called according to the kernel component call request through the component adaptor, where at least one kernel component is provided, and the component adaptor corresponds to the kernel component.

The component adaptor calls the corresponding kernel component according to the kernel component call request, and at this moment, the kernel component is a kernel component determined after the component adaptor implements the type selection.

In step S260, the kernel component call request is executed through the kernel component to execute processing of a set component function and satisfy a processing requirement for the to-be-processed blockchain data.

Specifically, the kernel component call request is executed through the kernel component determined after the type selection to execute the processing of the set component function and satisfy the processing requirement for the to-be-processed blockchain data.

In an optional embodiment, the step in which the kernel component call request is executed through the kernel component to execute the processing of the set component function includes steps described below. The kernel component call request is executed through the kernel component, a basic component call request is generated based on a basic component interface in a process of processing the kernel component call request, and a corresponding basic component is called according to the basic component call request, where at least one basic component is provided. The processing of the set component function is implemented according to a basic component processing result fed back by the corresponding basic component through the kernel component.

The basic component refers to a basic function component completely independent of the specific business scene and used for supporting the operation of the blockchain system. In an optional embodiment, the basic component includes at least one of: a basic storage component, a peer-to-peer network component, a cryptography library component, a codec component or a log library component.

The basic storage component, the peer-to-peer network component, the cryptography library component, the codec component and the log library component are respectively used for supporting a data storage function, a network interaction and data transmission function, a signature encryption and decryption function, a data codec function and a blockchain system operation status recording function during the operation process of the blockchain system.

The kernel component determines the corresponding basic component interface according to various parameters in the kernel component call request, and generates the basic component call request. The kernel component calls the corresponding basic component based on the basic component interface according to the basic component call request, and executes the basic component call request through the basic component.

The basic component interface refers to an interface providing a standard basic component function for facilitating the kernel component to call the basic component when implementing the basic component according to a basic component programming specification. Similar to the kernel component call request, the types and number of parameters included in the basic component call request are determined according to a preset basic component programming specification, and are not limited herein and are specifically determined according to actual situations. Exemplarily, the basic component call request includes: a basic component name, an input parameter, a requirement return parameter, a callback parameter and other parameters.

Optionally, the kernel component generates at least one basic component call request during the process of executing the kernel component call request.

After executing the basic component call request, the basic component feeds back the basic component processing result to the kernel component, so as to implement the processing of the set component function and satisfy the processing requirement for the to-be-processed blockchain data.

According to the technical solution of the embodiment of the present disclosure, the kernel engine cooperates with the kernel component, so that the processing requirement for the to-be-processed blockchain data is satisfied. In the present disclosure, both the kernel engine and the kernel component use a modular design, and the two cooperate to work through the component adaptor so as to achieve loose coupling between modules. The component adaptor is introduced, so that both the kernel engine and the kernel component can be freely extended. On the other hand, when the kernel component interface is called, the to-be-called kernel component is determined from the kernel component set of the same type through the component adaptor, the kernel component call request is generated according to the kernel instruction interface of the to-be-called kernel component, and complete standard kernel components are built in the blockchain system for users to select the kernel component according to requirements, so that personalized requirements of the users are satisfied, and the application scenes of the blockchain system is extended. The method for operating a blockchain system provided by the present disclosure reduces the difficulty of developing the blockchain system to the extent that users only need to extend the function of the kernel component or the kernel engine according to scene requirements, thus greatly reducing the development cost of the blockchain technology.

Figure 3:
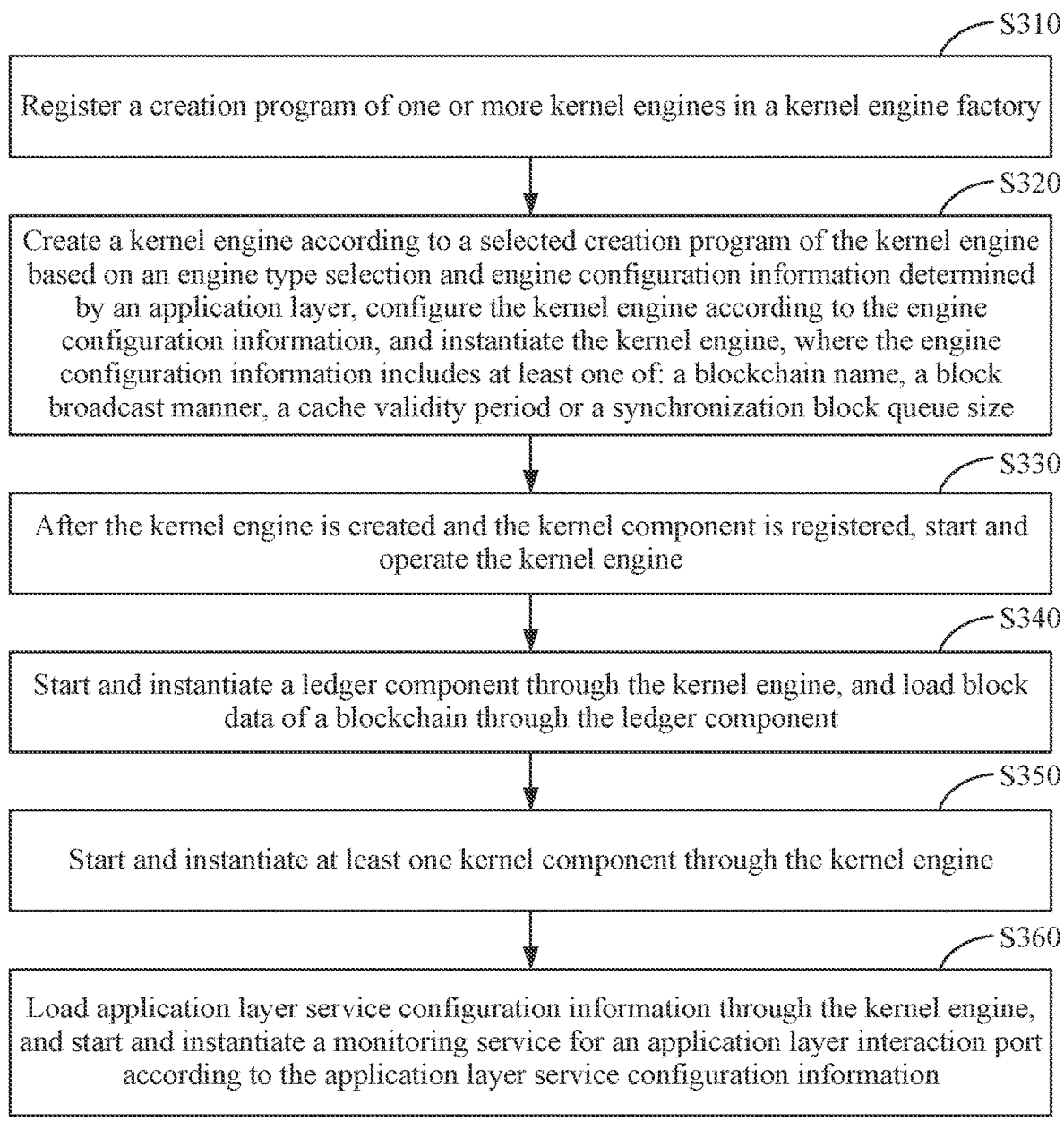
FIG. 3 is a diagram showing another method for operating a blockchain system according to an embodiment of the present disclosure.

FIG. 3 is a diagram showing another method for operating a blockchain system according to an embodiment of the present disclosure. This embodiment is an optional solution provided based on the preceding embodiment. Specifically, the starting process of a blockchain node in the blockchain system is described.

Referring to FIG. 3, the method for operating a blockchain system provided by the embodiment includes steps described below.

In step S310, a creation program of one or more kernel engines is registered in a kernel engine factory.

The embodiment of the present disclosure uses a factory mode to instantiate the kernel engine. Specifically, different requirements exist for the kernel engine under different business application scenes. To facilitate the blockchain system to satisfy the requirements of different business scenes, a creation program of the kernel engine required by a user is registered in the kernel engine factory during the starting process of the blockchain system.

One or more kernel engines may be registered in the kernel engine factory. Optionally, multiple kernel engines are registered in the kernel engine factory, so as to facilitate the user to instantiate the corresponding kernel engine according to requirements, and avoid performing the kernel engine registration process multiple times.

Optionally, the engine is registered in an init initialization registration manner. When the application layer imports a corresponding kernel engine package to the kernel engine layer, the registration process of the kernel engine is automatically completed. The kernel engine package may include a creation program of the kernel engine and a configuration file of the kernel engine. The registration of the creation program of one or more kernel engines in the kernel engine factory is performed during the deployment stage of the blockchain, that is, during the initial creation of the blockchain.

In step S320, a kernel engine is created according to a selected creation program of the kernel engine based on an engine type selection and engine configuration information determined by an application layer, the kernel engine is configured according to the engine configuration information, and the kernel engine is instantiated, where the engine configuration information includes at least one of: a blockchain name, a block broadcast manner, a cache validity period or a synchronization block queue size.

In the deployment stage of the blockchain, the user configures the engine type selection and engine configuration information of the kernel engine in the blockchain system through the client of the application layer according to specific business scene requirements; and then in the starting process of the blockchain, the user determines the creation program of the kernel engine which needs to be instantiated as a target kernel engine in the engine factory according to the engine type selection, and instantiates the target kernel engine according to the engine configuration information.

Type selection information of the engine refers to type information of the kernel engine, and the type selection information is related to the creation program of the kernel engine registered in the engine factory. Generally, the type selection information is independently specified by the user according to business scene requirements. Of course, default type selection information may also be set and used in the case where the type selection information is missing or cannot match the type of a pre-stored kernel engine.

The engine configuration information refers to information used for instantiating the kernel engine. Generally, the engine configuration information is set by the user according to actual requirements, and the engine configuration information includes at least one of: a blockchain name, a block broadcast manner, a cache validity period or a synchronization block queue size. The blockchain name serves as identification information of the blockchain, and is used for distinguishing different blockchains. The block broadcast manner defines a manner in which a node of the blockchain system transmits blockchain data to other block nodes in the blockchain system except a native node. The cache validity period defines a retention period of local cache data of a blockchain node. The synchronization block queue size defines the number of blocks that can be synchronized at one time. Basic parameters of the kernel engine are configured in the engine configuration information.

It is to be noted that the blockchain node starts operating after the blockchain is successfully started.

In step S330, after the kernel engine is created and the kernel component is registered, the kernel engine is started and operated.

Since the kernel engine represents a core flow of the blockchain kernel, if it is desired to satisfy the processing requirement for the to-be-processed blockchain data, it is also necessary to execute the set component function through the kernel component. Therefore, after the kernel engine is created, it is necessary to register the kernel component in the blockchain system. Only after the kernel engine is created and the kernel component is registered, can the kernel engine be started and operated.

In an optional embodiment, in response to a blockchain node being started, a component driver of the kernel component is registered in the component adaptor.

Specifically, during the starting process of the blockchain node, the component driver of the kernel component is registered in the component adaptor, so that the kernel instruction interface and the kernel component configuration parameter are registered. During the operation process of the initialization method of the kernel component, a main program calls an adaptor registration interface, and registers all kernel instruction interfaces in the corresponding component adaptor based on the adaptor registration interface. Optionally, a component instruction interface is agreed upon by the adaptor and implemented by the component driver. In the registration process of the kernel component, the component driver is registered in the component adaptor, which is equivalent to that the specific implementation logic of the kernel component is registered. After the registration, the adaptor may call the processing logic to complete the component function processing through the component instruction interface. The kernel instruction interface is an interface oriented to the kernel component and is used for converting the kernel component call instruction into a form recognizable by the corresponding kernel component in the case where the kernel engine calls the kernel component. The kernel component configuration parameter is used for configuring the basic parameters when the kernel component is called, and the configuration parameter of the kernel component includes the type selection information of the kernel component. Optionally, the kernel instruction interfaces of all the kernel component are registered in the component adaptor.

In an optional embodiment, a configuration parameter of the kernel component is acquired through the kernel engine, and a kernel component configuration parameter in the component adaptor is changed according to the configuration parameter.

In the case where the configuration parameter of the kernel component is changed, the kernel engine obtains the changed configuration parameter of the kernel component, and updates the configuration parameter of the corresponding kernel component in the component adaptor according to the configuration parameter.

In step S340, a ledger component is started and instantiated through the kernel engine, and block data of a blockchain is loaded through the ledger component.

Since the ledger of the blockchain is strongly related to the block nodes and deal data structures, ledger data has a fixed data structure, and in the embodiment of the present disclosure, the ledger component is bound to the kernel engine. When the kernel engine calls the ledger component, the same data structure as the ledger component needs to be input. The ledger component has no corresponding component adaptor, and replacing the ledger component needs to replace the kernel engine at the same time.

The kernel engine starts and instantiates the ledger component, and the block data of the blockchain is loaded through the ledger component.

In the embodiment of the present disclosure, a single kernel engine is bound with a ledger component, and different kernel engines share other kernel components except the ledger book, so that the kernel engine is independent of deals and block structures. Therefore, a user can achieve the customization of the kernel core processing flow and the technical type selection of the kernel engine according to requirements without kernel code invasion.

In step S350, at least one kernel component is started and instantiated through the kernel engine.

The kernel engine starts and instantiates the kernel component, and allocates computing resources and memory resources to the kernel component, so that the kernel component can execute a set function. Exemplarily, after the kernel engine is started, a network component is started and instantiated for periodically monitoring the presence of the to-be-processed blockchain data during the operation process of the blockchain system. Of course, other components in the blockchain system, such as the consensus component, the contract component and the permission component may also be simultaneously started and instantiated, and resources required by the kernel components are allocated to each kernel component to be used when the kernel components are called, thereby reducing the response delay of the blockchain system.

In step S360, application layer service configuration information is loaded through the kernel engine, and a monitoring service for an application layer interaction port is started and instantiated according to the application layer service configuration information.

The application layer service configuration information includes the application layer interaction port that needs to be monitored. The application layer interaction port refers to a port for the application layer to interact with the kernel engine. At least one application layer interaction port is provided, and generally multiple application layer interaction ports are provided.

The kernel engine loads the application layer service configuration information configured by a user, and starts and instantiates the monitoring service according to the application layer service configuration information to monitor the application layer interaction port for the kernel engine to interact with the application layer. Exemplarily, the monitoring service is a remote procedure call (RPC) service.

The technical solution of the embodiment of the present disclosure provides a starting process of the blockchain node in the blockchain system, and a multi-kernel engine architecture is implemented in the present disclosure. In the embodiment of the present disclosure, a user may customize multiple kernel engines according to business requirements and registers all the kernel engines in the kernel engine factory, and the kernel engines are instantiated through the kernel engine factory uniformly outside, so that the kernel engines can be freely extended without invasion. According to the embodiment of the present disclosure, the kernel component is registered in the component adaptor, and the kernel component is instantiated according to the configuration information, so that the technical type selection of the kernel component is achieved without code invasion of the kernel component, the modular design of the kernel engine and the kernel component is achieved, and the scene applicability of the blockchain system is extended. The method for operating a blockchain system provided by the present disclosure reduces the difficulty of developing the blockchain system to the extent that users only need to extend the function of the kernel component or the kernel engine according to scene requirements, thus greatly reducing the development cost of the blockchain technology.

Figure 4:
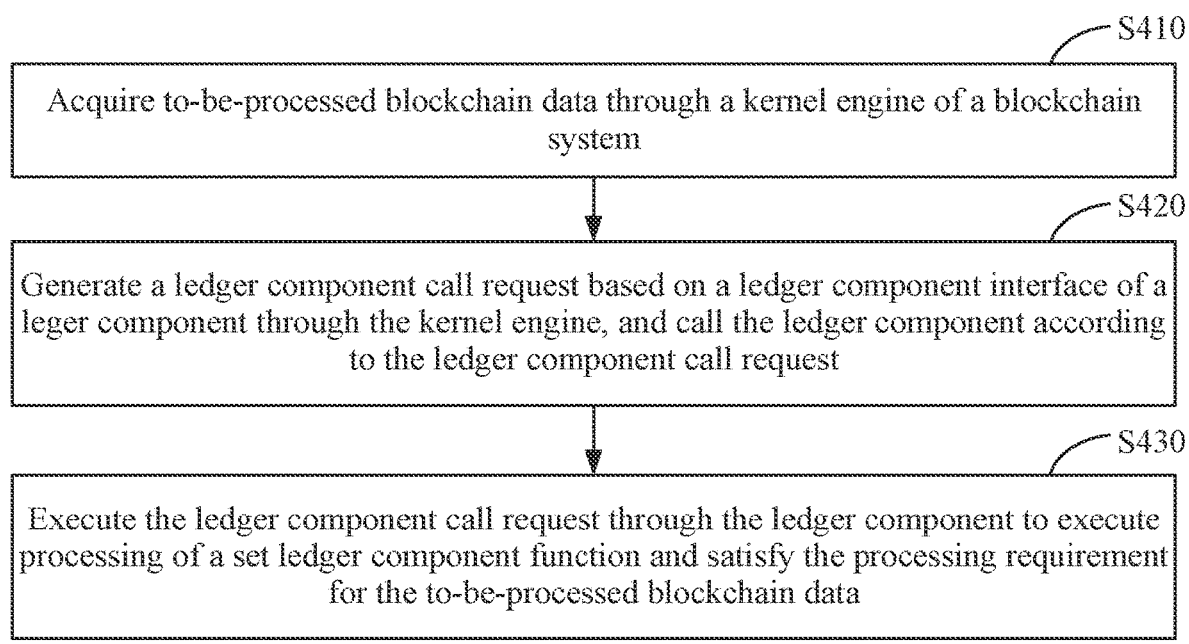
FIG. 4 is a diagram showing another method for operating a blockchain system according to an embodiment of the present disclosure.

FIG. 4 is a diagram showing another method for operating a blockchain system according to an embodiment of the present disclosure. This embodiment is an optional solution provided based on the preceding embodiment. Specifically, the step is refined in which the kernel component call request is generated based on the kernel component interface during the processing process through the kernel engine, and the corresponding kernel component is called according to the kernel component call request.

Referring to FIG. 4, the method for operating a blockchain system provided by the embodiment includes steps described below.

In step S410, to-be-processed blockchain data is acquired through a kernel engine of a blockchain system.

Since a ledger of the blockchain is strongly related to block nodes and deal data structures, ledger data has a fixed data structure, and in the embodiment of the present disclosure, a ledger component is bound to the kernel engine.

In an optional embodiment, the to-be-processed blockchain data is a to-be-processed transaction request, and a ledger data format of the to-be-processed transaction request is the same as a ledger data format of the ledger component.

The to-be-processed transaction request refers to a transaction request for operating data on the blockchain. In the embodiment of the present disclosure, the transaction request may be any transaction request supported in the blockchain system and may be a business transaction request, a management transaction request or the like which is related to the specific business.

To ensure that the kernel engine is able to call the ledger component, the ledger data of the to-be-processed transaction request acquired by the kernel engine needs to have the same format as the ledger data of the ledger component. Specifically, the ledger data of the to-be-processed transaction request needs to have the same field as the ledger data of the ledger component.

In step S420, a ledger component call request is generated based on a ledger component interface of a leger component through the kernel engine, and the ledger component is called according to the ledger component call request.

The ledger component has no corresponding component adaptor, and the ledger component is bound to the kernel engine. In the case where the kernel engine needs to call the ledger component, the kernel engine calls the ledger component directly and no longer through the component adaptor. Specifically, the kernel engine generates the ledger component call request based on the ledger component interface provided by the ledger component for the kernel engine, and calls the ledger component according to the ledger component call request.

In step S430, the ledger component call request is executed through the ledger component to execute processing of a set ledger component function and satisfy the processing requirement for the to-be-processed blockchain data.

The ledger component executes the set ledger component function according to various parameters in the ledger component call request, and satisfies the processing requirement for the to-be-processed blockchain data. The set ledger component function is related to the processing requirement for the to-be-processed blockchain data, and is determined specifically according to actual situations. Exemplarily, the set ledger component function may be block updating, block check or deal check.

According to the embodiment of the present disclosure, the particularity of the data structure of the ledger data is considered, the ledger component is bound to the kernel engine, and the participation of the component adaptor is not required. The ledger component is directly called based on the ledger component interface through the kernel engine, which avoids complex data format conversion on the ledger data and simplifies the blockchain system.

Figure 5:
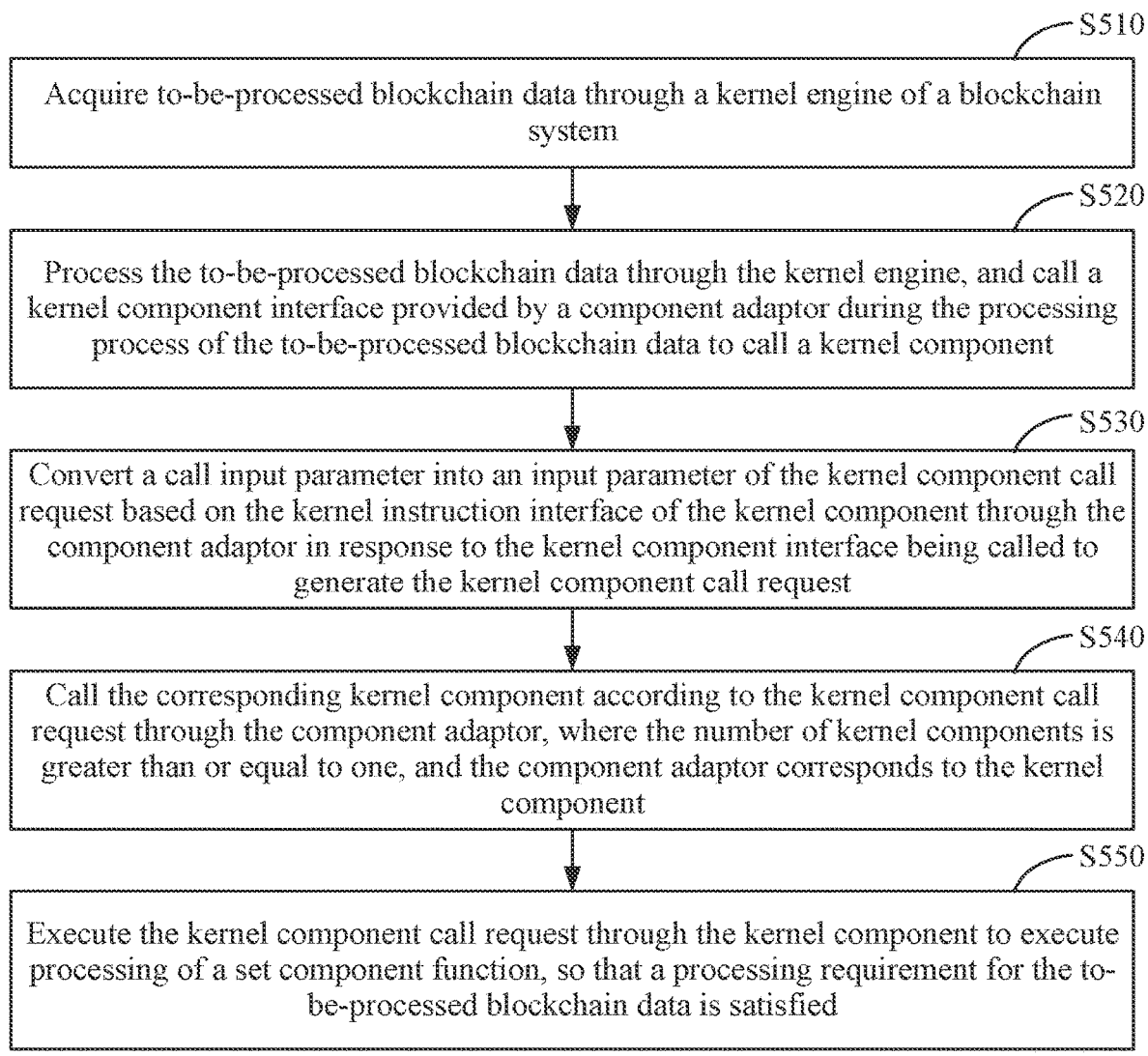
FIG. 5 is a diagram showing another method for operating a blockchain system according to an embodiment of the present disclosure.

FIG. 5 is a diagram showing another method for operating a blockchain system according to an embodiment of the present disclosure. This embodiment is an optional solution provided based on the preceding embodiment. Specifically, the step is refined in which the kernel component call request is generated according to the kernel instruction interface of the kernel component through the component adaptor in response to the kernel component interface being called.

Referring to FIG. 5, the method for operating a blockchain system provided by the embodiment includes steps described below.

In step S510, to-be-processed blockchain data is acquired through a kernel engine of a blockchain system.

In step S520, the to-be-processed blockchain data is processed through the kernel engine, and a kernel component interface provided by a component adaptor is called during the processing process of the to-be-processed blockchain data to call a kernel component.

In step S530, a call input parameter is converted into an input parameter of the kernel component call request based on the kernel instruction interface of the kernel component through the component adaptor in response to the kernel component interface being called to generate the kernel component call request.

The call input parameter is generated by the kernel engine based on the kernel component interface, and the differences between the instruction system of the kernel engine and the instruction system of the kernel component causes the call input parameter to be directly recognized by the kernel component in a large probability.

The input parameter of the kernel component call request refers to a call input parameter processed by the kernel instruction interface, and is an input parameter which can be directly recognized by the corresponding kernel component.

When the kernel component interface is called, the component adaptor converts the input parameter of the kernel component call request based on the kernel instruction interface of the kernel component, and generates the kernel component call request according to the converted input parameter. The generated kernel component call request can be directly recognized by the kernel component. Exemplarily, the conversion of the call input parameter by the kernel instruction interface may implement the mapping conversion of the interface name in the call input parameter, and may also implement the conversion of the name and type of an interface input parameter.

In an optional embodiment, interface parameters of the kernel component interface or interface parameters of the kernel instruction interface include: an interface name, an input parameter, a return parameter and a callback function, where the interface parameters of the kernel component interface are different from the interface parameters of the kernel instruction interface.

The interface parameters of the kernel component interface have the same types and number as the interface parameters of the kernel instruction interface. The interface parameters of the kernel instruction interface correspond to the interface parameters of the kernel component interface. The difference lies in that the interface parameters of the kernel instruction interface are oriented to the kernel component, and can be directly recognized by the kernel component for implementing a set function; the interface parameters of the kernel component interface are provided by the kernel engine and for the kernel engine to select the function of the kernel component.

Generally, the interface parameters of the kernel component interface are different from and, of course, may be the same as the interface parameters of the kernel instruction interface. Exemplarily, a possibility exists that the interface names of the interface parameters of the kernel component interface are the same as the interface names of the interface parameters of the kernel instruction interface, which may be specifically determined according to actual situations.

In step S540, the corresponding kernel component is called according to the kernel component call request through the component adaptor, where at least one kernel component is provided, and the component adaptor corresponds to the kernel component.

In step S550, the kernel component call request is executed through the kernel component to execute processing of a set component function and satisfy a processing requirement for the to-be-processed blockchain data.

According to the technical solution of the embodiment of the present disclosure, the kernel engine cooperates with the kernel component, so that the processing requirement for the to-be-processed blockchain data is satisfied. In the present disclosure, both the kernel engine and the kernel component use a modular design, and the two cooperate to work through the component adaptor so as to achieve loose coupling between modules. The component adaptor provides the kernel component interface for the kernel engine to enable the kernel engine to select the kernel component according to requirements. On the other hand, the component adaptor converts, through the kernel instruction interface, a kernel component call instruction of the kernel engine and the to-be-processed blockchain data into a form that can be recognized by the kernel component. The component adaptor is introduced, so that both the kernel engine and the kernel component can be freely extended, and thereby the scene applicability of the blockchain system is extended. The method for operating a blockchain system provided by the present disclosure reduces the difficulty of developing the blockchain system to the extent that users only need to extend the function of the kernel component or the kernel engine according to scene requirements, thus greatly reducing the development cost of the blockchain technology.

Figure 6:
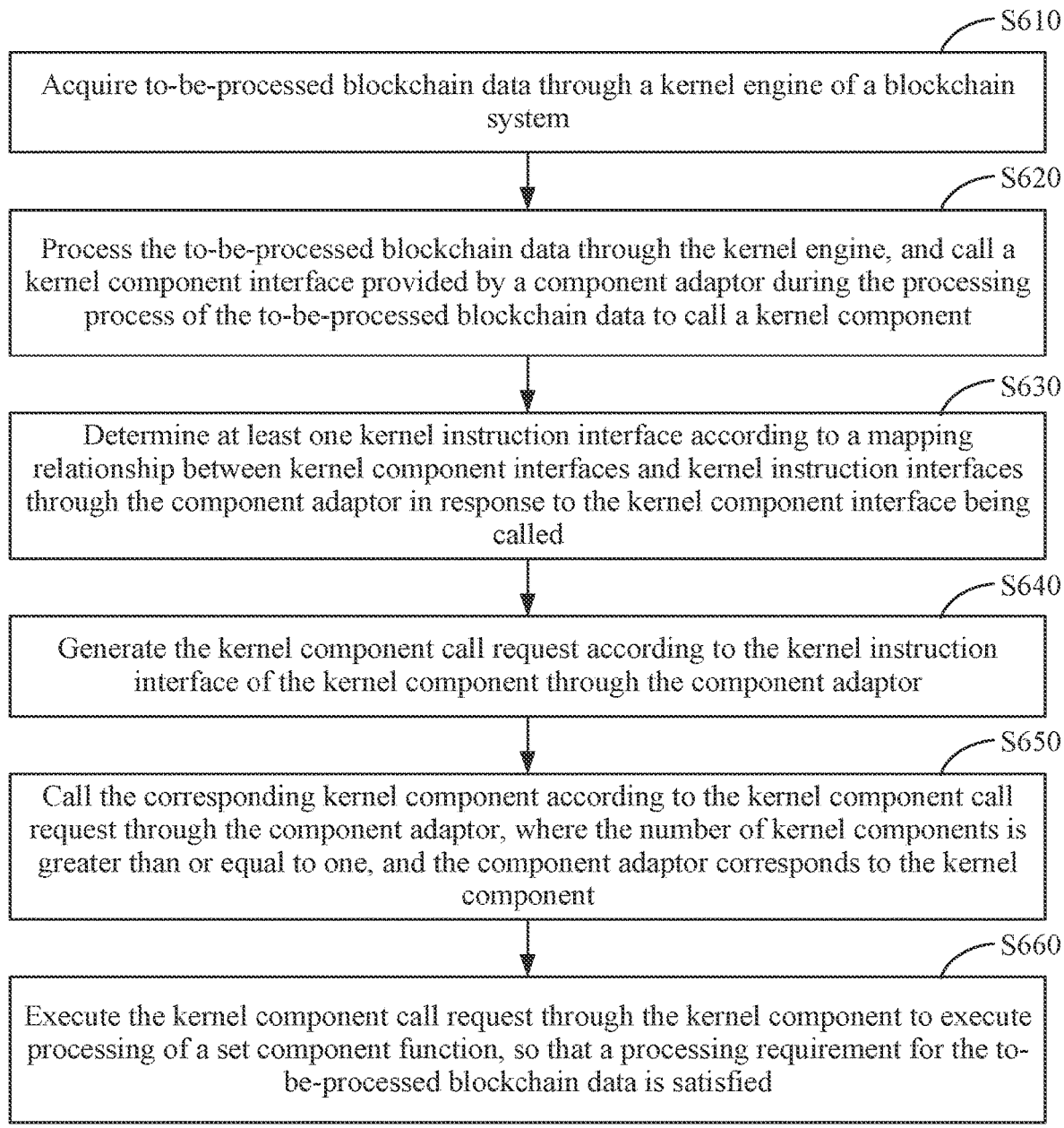
FIG. 6 is a diagram showing another method for operating a blockchain system according to an embodiment of the present disclosure.

FIG. 6 is a diagram showing another method for operating a blockchain system according to an embodiment of the present disclosure. This embodiment is an optional solution provided based on the preceding embodiment. Specifically, the step is refined in which the kernel component call request is generated according to the kernel instruction interface of the kernel component through the component adaptor in response to the kernel component interface being called.

Referring to FIG. 6, the method for operating a blockchain system provided by the embodiment includes steps described below.

In step S610, to-be-processed blockchain data is acquired through a kernel engine of a blockchain system.

In step S620, the to-be-processed blockchain data is processed through the kernel engine, and a kernel component interface provided by a component adaptor is called during the processing process to call a kernel component.

In step S630, at least one kernel instruction interface is determined according to a mapping relationship between kernel component interfaces and kernel instruction interfaces through the component adaptor in response to the kernel component interface being called.

The mapping relationship between kernel component interfaces and kernel instruction interfaces is registered in the component adaptor in an deployment stage of the blockchain system.

When the kernel component interface is called, according to the mapping relationship between kernel component interfaces and kernel instruction interfaces, a kernel instruction interface corresponding to the kernel component interface may be determined from the kernel instruction interfaces. A kernel component interface may correspond to multiple kernel instruction interfaces.

In step S640, the kernel component call request is generated according to the kernel instruction interface of the kernel component through the component adaptor.

The kernel component call request refers to a call request that can be recognized by the kernel component and directly executed without secondary conversion. The kernel component call request is generated by the component adaptor according to the kernel instruction interface of the kernel component.

In step S650, the corresponding kernel component is called according to the kernel component call request through the component adaptor, where at least one kernel component is provided, and the component adaptor corresponds to the kernel component.

In step S660, the kernel component call request is executed through the kernel component to execute processing of a set component function and satisfy a processing requirement for the to-be-processed blockchain data.

According to the technical solution of the embodiment of the present disclosure, the kernel engine cooperates with the kernel component, so that the processing requirement for the to-be-processed blockchain data is satisfied. In the present disclosure, both the kernel engine and the kernel component use a modular design, and the two cooperate to work through the component adaptor so as to achieve loose coupling between modules. The component adaptor provides the kernel component interface for the kernel engine to enable the kernel engine to select the kernel component according to requirements. On the other hand, the component adaptor converts, through the kernel instruction interface, a kernel component call instruction of the kernel engine and the to-be-processed blockchain data into a form that can be recognized by the kernel component. The component adaptor is introduced, so that both the kernel engine and the kernel component can be freely extended, and thereby the scene applicability of the blockchain system is extended. The method for operating a blockchain system provided by the present disclosure reduces the difficulty of developing the blockchain system to the extent that users only need to extend the function of the kernel component or the kernel engine according to scene requirements, thus greatly reducing the development cost of the blockchain technology.

Figure 7:
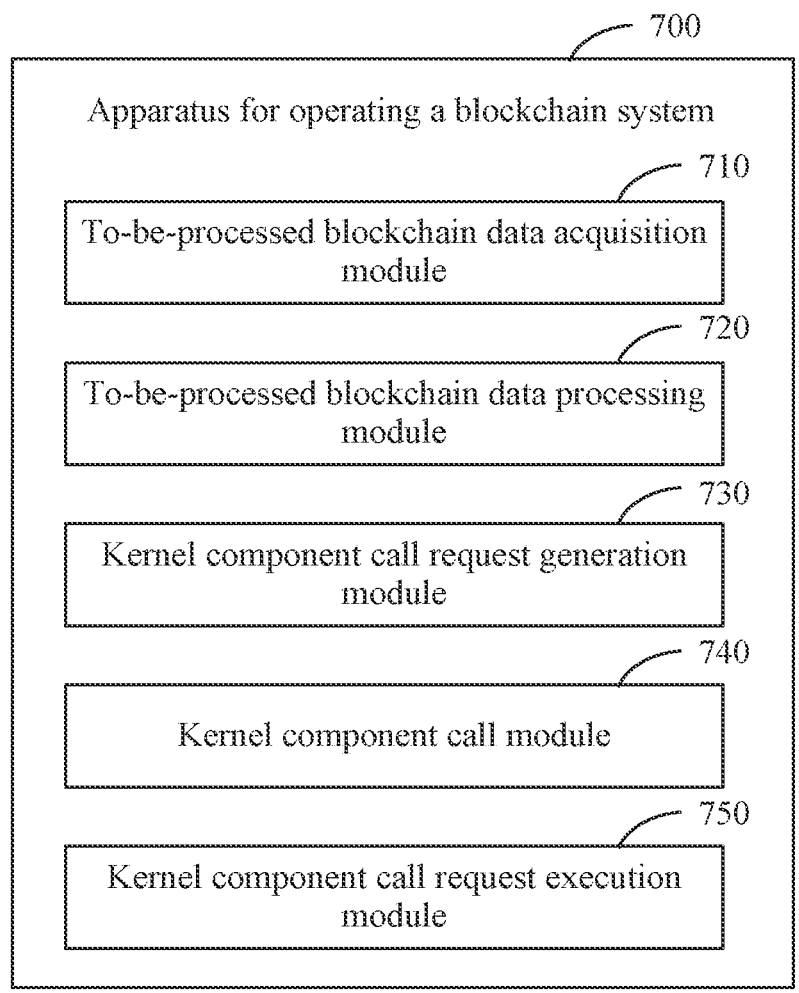
FIG. 7 is a diagram showing an apparatus for operating a blockchain system according to an embodiment of the present disclosure.

FIG. 7 is a diagram showing an apparatus for operating a blockchain system according to an embodiment of the present disclosure. Referring to FIG. 7, the embodiment of the present disclosure discloses an apparatus 700 for blockchain system operation, which is configured at a blockchain node. The apparatus 700 may include: a to-be-processed blockchain data acquisition module 710 and a to-be-processed blockchain data processing module 720.

The apparatus 700 may further include a kernel component call request generation module 730, a kernel component call module 740 and a kernel component call request execution module 750.

The to-be-processed blockchain data acquisition module 710 is configured to acquire, through a kernel engine of a blockchain system, to-be-processed blockchain data.

The to-be-processed blockchain data processing module 720 is configured to process, through the kernel engine, the to-be-processed blockchain data, and call a kernel component interface provided by a component adaptor during the processing process to call a kernel component.

The kernel component call request generation module 730 is configured to generate, through the component adaptor, a kernel component call request according to a kernel instruction interface of a kernel component in response to the kernel component interface being called.

The kernel component call module 740 is configured to call, through the component adaptor, the corresponding kernel component according to the kernel component call request, where at least one kernel component is provided, and the component adaptor corresponds to the kernel component.

The kernel component call request execution module 750 is configured to execute, through the kernel component, the kernel component call request to execute processing of a set component function and satisfy a processing requirement for the to-be-processed blockchain data.

According to the technical solution of the embodiment of the present disclosure, the kernel engine cooperates with the kernel component, so that the processing requirement for the to-be-processed blockchain data is satisfied. In the present disclosure, both the kernel engine and the kernel component use a modular design, and the two cooperate to work through the component adaptor so as to achieve loose coupling between modules. The component adaptor provides the kernel component interface for the kernel engine to enable the kernel engine to select the kernel component according to requirements. On the other hand, the component adaptor converts, through the kernel instruction interface, a kernel component call instruction of the kernel engine and the to-be-processed blockchain data into a form that can be recognized by the kernel component. The component adaptor is introduced, so that both the kernel engine and the kernel component can be freely extended, and thereby the scene applicability of the blockchain system is extended. The method for operating a blockchain system provided by the present disclosure reduces the difficulty of developing the blockchain system to the extent that users only need to extend the function of the kernel component or the kernel engine according to scene requirements, thus greatly reducing the development cost of the blockchain technology.

Optionally, the kernel component call request generation module 730 includes a to-be-called kernel component determination submodule and a kernel component call request generation submodule. The to-be-called kernel component determination submodule is configured to determine, through the component adaptor, a to-be-called kernel component from a kernel component set of a same type in response to the kernel component interface being called.

The kernel component call request generation submodule is configured to generate the kernel component call request according to a kernel instruction interface of the to-be-called kernel component.

Optionally, the to-be-called kernel component determination submodule is specifically configured to determine, through the component adaptor, the to-be-called kernel component from the kernel component set of the same type according to a kernel component configuration parameter deployed in a blockchain in response to the kernel component interface being called, where the kernel component configuration parameter includes a kernel component type selection.

Optionally, sets of kernel components of a same type include at least one of following types: a contract component set, a network component set or a consensus component set. Types of contract components include a native code contract virtual machine, a web bytecode contract virtual machine or an Ethereum contract virtual machine.

Types of network components include a peer-to-peer network.

Types of consensus components include a single consensus component, a proof of work (POW) consensus component, an XPOS consensus component or an XPOA consensus component.

Optionally, the apparatus 700 further includes a kernel component registration module, which is specifically configured to in response to a blockchain node being started, register a component driver of the kernel component in the component adaptor.

Optionally, the apparatus 700 further includes a kernel component configuration parameter change module, which is configured to acquire, through the kernel engine, a configuration parameter of the kernel component, and change a kernel component configuration parameter in the component adaptor according to the configuration parameter.

Optionally, in response to the blockchain node being started, the apparatus 700 further includes a kernel engine creation program registration module, a kernel engine creation and configuration module, a kernel engine operation and starting module, a ledger component instantiation module, a kernel component instantiation module and an application layer interaction port monitoring service instantiation module.

The kernel engine creation program registration module is configured to register a creation program of one or more kernel engines in a kernel engine factory.

The kernel engine creation and configuration module is configured to according to an engine type selection and engine configuration information determined by an application layer, create a kernel engine according to a selected creation program of the kernel engine, configure the kernel engine according to the engine configuration information, and instantiate the kernel engine, where the engine configuration information includes at least one of: a blockchain name, a block broadcast manner, a cache validity period or a synchronization block queue size.

The kernel engine operation and starting module is configured to after the kernel engine is created and the kernel component is registered, start and operate the kernel engine.

The ledger component instantiation module is configured to start and instantiate, through the kernel engine, a ledger component, and load, through the ledger component, block data of a blockchain.

The kernel component instantiation module is configured to start and instantiate, through the kernel engine, at least one kernel component.

The application layer interaction port monitoring service instantiation module is configured to load, through the kernel engine, application layer service configuration information, and start and instantiate a monitoring service for an application layer interaction port according to the application layer service configuration information.

Optionally, the to-be-processed blockchain data processing module 720 further includes a ledger component call submodule and a ledger component call request execution submodule. The ledger component call submodule is configured to generate, through the kernel engine, a ledger component call request based on a ledger component interface of a leger component, and call the ledger component according to the ledger component call request.

The ledger component call request execution submodule is configured to execute, through the ledger component, the ledger component call request to execute processing of a set ledger component function and satisfy the processing requirement for the to-be-processed blockchain data.

Optionally, the to-be-processed blockchain data is a to-be-processed transaction request, and a ledger data format of the to-be-processed transaction request is the same as a ledger data format of the ledger component.

Optionally, the kernel component call request generation module 730 includes an input parameter conversion submodule, which is configured to convert, through the component adaptor, a call input parameter into an input parameter of the kernel component call request based on the kernel instruction interface of the kernel component in response to the kernel component interface being called to generate the kernel component call request.

Optionally, interface parameters of the kernel component interface or interface parameters of the kernel instruction interface include: an interface name, an input parameter, a return parameter and a callback function, where the interface parameters of the kernel component interface are different from the interface parameters of the kernel instruction interface.

Optionally, the kernel component call request generation module 730 includes a kernel instruction interface determination submodule and the kernel component call request generation submodule. The kernel instruction interface determination submodule is configured to determine, through the component adaptor, at least one kernel instruction interface according to a mapping relationship between kernel component interfaces and kernel instruction interfaces in response to the kernel component interface being called.

The kernel component call request generation submodule is configured to generate, through the component adaptor, the kernel component call request according to the kernel instruction interface of the kernel component.

Optionally, the kernel component call request execution module 750 includes a basic component call request generation module and a set component function implementation submodule. The basic component call request generation module is configured to execute, through the kernel component, the kernel component call request, generate a basic component call request based on a basic component interface in a process of processing the kernel component call request, and call a corresponding basic component according to the basic component call request, where at least one basic component is provided.

The set component function implementation submodule is configured to implement, through the kernel component, the processing of the set component function according to a basic component processing result fed back by the corresponding basic component.

The apparatus for operating a blockchain system provided by the embodiment of the present disclosure may execute the method for operating a blockchain system provided by any embodiment of the present disclosure, and has corresponding functional modules and beneficial effects for executing the method for operating a blockchain system.

According to the embodiments of the present disclosure, the present disclosure further provides an electronic device, a readable storage medium and a computer program product.

Figure 8:
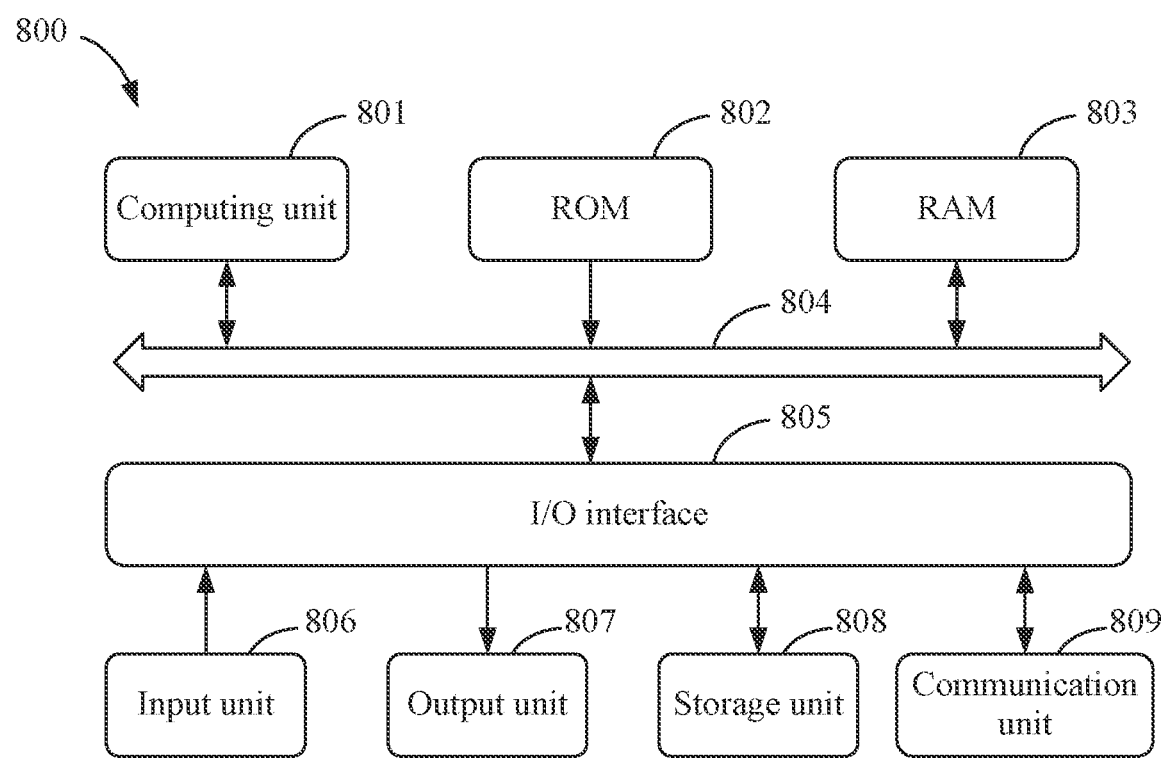
FIG. 8 is a block diagram of an electronic device for implementing a method for operating a blockchain system according to an embodiment of the present disclosure.

FIG. 8 shows a block diagram illustrative of an exemplary electronic device 800 that may be used for implementing the embodiments of the present disclosure. Electronic devices are intended to represent various forms of digital computers, for example, laptop computers, desktop computers, worktables, personal digital assistants, servers, blade servers, mainframe computers and other applicable computers. Electronic devices may further represent various forms of mobile apparatuses, for example, personal digital assistants, cellphones, smartphones, wearable devices and other similar computing apparatuses. Herein the shown components, the connections and relationships between these components, and the functions of these components are illustrative only and are not intended to limit the implementation of the present disclosure as described and/or claimed herein.

As shown in FIG. 8, the device 800 includes a computing unit 801. The computing unit 801 may perform various types of appropriate operations and processing based on a computer program stored in a read-only memory (ROM) 802 or a computer program loaded from a storage unit 808 to a random-access memory (RAM) 803. Various programs and data required for operations of the device 800 may also be stored in the RAM 803. The computing unit 801, the ROM 802 and the RAM 803 are connected to each other through a bus 804. An input/output (I/O) interface 805 is also connected to the bus 804.

Multiple components in the device 800 are connected to the I/O interface 805. The components include an input unit 806 such as a keyboard and a mouse, an output unit 807 such as various types of displays and speakers, the storage unit 808 such as a magnetic disk and an optical disk, and a communication unit 809 such as a network card, a modem and a wireless communication transceiver. The communication unit 809 allows the device 800 to exchange information/data with other devices over a computer network such as the Internet and/or various telecommunications networks.

The computing unit 801 may be various general-purpose and/or special-purpose processing components having processing and computing capabilities. Examples of the computing unit 801 include, but are not limited to, a central processing unit (CPU), a graphics processing unit (GPU), a special-purpose artificial intelligence (AI) computing chip, a computing unit executing machine learning models and algorithms, a digital signal processor (DSP) and any appropriate processor, controller and microcontroller. The computing unit 801 executes various preceding methods and processing, such as the method for operating a blockchain system. For example, in some embodiments, the method for operating a blockchain system may be implemented as a computer software program tangibly contained in a machine-readable medium such as the storage unit 808. In some embodiments, part or all of computer programs may be loaded and/or installed on the device 800 via the ROM 802 and/or the communication unit 809. When the computer programs are loaded to the RAM 803 and executed by the computing unit 801, one or more steps of the preceding method for operating a blockchain system may be executed. Alternatively, in other embodiments, the computing unit 801 may be configured, in any other suitable manner (for example, by means of firmware), to execute the method for operating a blockchain system.

Herein various embodiments of the systems and techniques described above may be implemented in digital electronic circuitry, integrated circuitry, field-programmable gate arrays (FPGAs), application-specific integrated circuits (ASICs), application-specific standard products (ASSPs), systems on chips (SOCs), complex programmable logic devices (CPLDs), computer hardware, firmware, software and/or combinations thereof. The various embodiments may include implementations in one or more computer programs. The one or more computer programs are executable and/or interpretable on a programmable system including at least one programmable processor. The programmable processor may be a special-purpose or general-purpose programmable processor for receiving data and instructions from a memory system, at least one input apparatus and at least one output apparatus and transmitting the data and instructions to the memory system, the at least one input apparatus and the at least one output apparatus.

Program codes for implementation of the method of the present disclosure may be written in any combination of one or more programming languages. The program codes may be provided for the processor or controller of a general-purpose computer, a special-purpose computer or another programmable data processing apparatus to enable functions/operations specified in flowcharts and/or block diagrams to be implemented when the program codes are executed by the processor or controller. The program codes may be executed in whole on a machine, executed in part on a machine, executed, as a stand-alone software package, in part on a machine and in part on a remote machine, or executed in whole on a remote machine or a server.

In the context of the present disclosure, a machine-readable medium may be a tangible medium that may contain or store a program that is used by or in conjunction with a system, apparatus or device that executes instructions. The machine-readable medium may be a machine-readable signal medium or a machine-readable storage medium. The machine-readable medium may include, but is not limited to, an electronic, magnetic, optical, electromagnetic, infrared or semiconductor system, apparatus or device or any suitable combination thereof. More specific examples of the machine-readable storage medium may include an electrical connection based on one or more wires, a portable computer disk, a hard disk, a random-access memory (RAM), a read-only memory (ROM), an erasable programmable read-only memory (EPROM) or a flash memory, an optical fiber, a portable compact disk read-only memory (CD-ROM), an optical memory device, a magnetic memory device, or any suitable combination thereof.

In order that interaction with a user is provided, the systems and techniques described herein may be implemented on a computer. The computer has a display apparatus (for example, a cathode-ray tube (CRT) or a liquid-crystal display (LCD) monitor) for displaying information to the user and a keyboard and a pointing apparatus (for example, a mouse or a trackball) through which the user can provide input to the computer. Other types of apparatuses may also be used for providing interaction with a user. For example, feedback provided for the user may be sensory feedback in any form (for example, visual feedback, auditory feedback or haptic feedback). Moreover, input from the user may be received in any form (including acoustic input, voice input or haptic input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with implementations of the systems and techniques described herein) or a computing system including any combination of such back-end, middleware or front-end components. Components of a system may be interconnected by any form or medium of digital data communication (for example, a communication network). Examples of the communication network include a local area network (LAN), a wide area network (WAN), a blockchain network and the Internet.

The computing system may include clients and servers. The clients and servers are usually far away from each other and generally interact through the communication network. The relationship between the clients and the servers arises by virtue of computer programs running on respective computers and having a client-server relationship to each other. The server may be a cloud server, also referred to as a cloud computing server or a cloud host. As a host product in a cloud computing service system, the server solves the defects of difficult management and weak business scalability in conventional physical hosts and VPS services.

It is to be understood that various forms of the preceding flows may be used, with steps reordered, added or removed. For example, the steps described in the present disclosure may be executed in parallel, in sequence or in a different order as long as the desired result of the technical solution disclosed in the present disclosure is achieved. The execution sequence of these steps is not limited herein.

The scope of the present disclosure is not limited to the preceding embodiments. It is to be understood by those skilled in the art that various modifications, combinations, subcombinations and substitutions may be made according to design requirements and other factors. Any modifications, equivalent substitutions, improvements and the like made within the spirit and principle of the present disclosure fall within the scope of the present disclosure.

What is claimed is:

1. A method for operating a blockchain system, comprising:
　acquiring, through a kernel engine of the blockchain system, to-be-processed blockchain data;
　processing, through the kernel engine, the to-be-processed blockchain data, and calling a kernel component interface provided by a component adaptor during a processing process of the to-be-processed blockchain data to call a kernel component;
　generating, through the component adaptor, a kernel component call request according to a kernel instruction interface of the kernel component in response to the kernel component interface being called;
　calling, through the component adaptor, the kernel component corresponding to the kernel component call request according to the kernel component call request, wherein the number of kernel components is greater than or equal to one, and the component adaptor corresponds to the kernel component; and
　executing, through the kernel component, the kernel component call request to execute processing of a set component function, so that a processing requirement for the to-be-processed blockchain data is satisfied;
　wherein the generating, through the component adaptor, the kernel component call request according to the kernel instruction interface of the kernel component in response to the kernel component interface being called comprises:

determining, through the component adaptor, the to-be-called kernel component from a kernel component set of a same type according to a kernel component configuration parameter deployed in a blockchain in response to the kernel component interface being called, wherein the kernel component configuration parameter is pre-configured in the component adaptor by a user according to application scenes and business requirements of the blockchain system during a deployment process of the blockchain, and the kernel component configuration parameter comprises a kernel component type selection; and generating the kernel component call request according to a kernel instruction interface of the to-be-called kernel component.

2. The method according to claim 1, wherein the kernel component set comprises at least one of following types:

a contract component set, wherein types of contract components comprise a native code contract virtual machine, a web bytecode contract virtual machine or an Ethereum contract virtual machine;

a network component set, wherein types of network components comprise a peer-to-peer network; or a consensus component set, wherein types of consensus components comprise a single consensus component, a proof of work (POW) consensus component, an XPOS consensus component or an XPOA consensus component.

3. The method according to claim 1, further comprising:

in response to a blockchain node being started, registering a component driver of the kernel component in the component adaptor.

4. The method according to claim 1, further comprising:

acquiring, through the kernel engine, a configuration parameter of the kernel component, and changing the configuration parameter of the kernel component in the component adaptor according to the configuration parameter.

5. The method according to claim 4, in response to the blockchain node being started, further comprising:

registering a creation program of one or more kernel engines in a kernel engine factory;

creating a kernel engine according to a selected creation program of the kernel engine based on an engine type selection and engine configuration information determined by an application layer, configuring the kernel engine according to the engine configuration information, and instantiating the kernel engine, wherein the engine configuration information comprises at least one of: a blockchain name, a block broadcast manner, a cache validity period or a synchronization block queue size;

after the kernel engine is created and the kernel component is registered, starting and operating the kernel engine;

starting and instantiating, through the kernel engine, a ledger component, and loading, through the ledger component, block data of a blockchain;

starting and instantiating, through the kernel engine, at least one kernel component; and loading, through the kernel engine, application layer service configuration information, and starting and instantiating a monitoring service for an application layer interaction port according to the application layer service configuration information.

6. The method according to claim 1, wherein the processing, through the kernel engine, the to-be-processed blockchain data further comprises:

generating, through the kernel engine, a ledger component call request based on a ledger component interface of a leger component, and calling the ledger component according to the ledger component call request; and executing, through the ledger component, the ledger component call request to execute processing of a set ledger component function and satisfy the processing requirement for the to-be-processed blockchain data.

7. The method according to claim 6, wherein the to-be-processed blockchain data is a to-be-processed transaction request, and a ledger data format of the to-be-processed transaction request is the same as a ledger data format of the ledger component.

8. The method according to claim 1, wherein the generating, through the component adaptor, the kernel component call request according to the kernel instruction interface of the kernel component in response to the kernel component interface being called comprises:

converting, through the component adaptor, a call input parameter into an input parameter of the kernel component call request based on the kernel instruction interface of the kernel component in response to the kernel component interface being called to generate the kernel component call request.

9. The method according to claim 8, wherein interface parameters of the kernel component interface or interface parameters of the kernel instruction interface comprise: an interface name, an input parameter, a return parameter and a callback function, wherein the interface parameters of the kernel component interface are different from the interface parameters of the kernel instruction interface.

10. The method according to claim 1, wherein the generating, through the component adaptor, the kernel component call request according to the kernel instruction interface of the kernel component in response to the kernel component interface being called comprises:

determining, through the component adaptor, at least one kernel instruction interface according to a mapping relationship between kernel component interfaces and kernel instruction interfaces in response to the kernel component interface being called; and generating, through the component adaptor, the kernel component call request according to the kernel instruction interface of the kernel component.

11. The method according to claim 1, wherein the executing, through the kernel component, the kernel component call request to execute the processing of the set component function comprises:

executing, through the kernel component, the kernel component call request, generating a basic component call request based on a basic component interface in a process of processing the kernel component call request, and calling a corresponding basic component according to the basic component call request, wherein the number of basic components is greater than or equal to one; and implementing, through the kernel component, the processing of the set component function according to a basic component processing result fed back by the corresponding basic component.

12. An apparatus for operating a blockchain system, comprising:
- at least one processor; and
- a memory communicatively connected to the at least one processor;
- wherein the memory stores instructions executable by the at least one processor to cause the at least one processor to perform a method for operating the blockchain system, wherein the method comprises:
- acquiring, through a kernel engine of the blockchain system, to-be-processed blockchain data;
- processing, through the kernel engine, the to-be-processed blockchain data, and calling a kernel component interface provided by a component adaptor during a processing process of the to-be-processed blockchain data to call a kernel component;
- generating, through the component adaptor, a kernel component call request according to a kernel instruction interface of the kernel component in response to the kernel component interface being called;
- calling, through the component adaptor, the kernel component corresponding to the kernel component call request according to the kernel component call request, wherein the number of kernel components is greater than or equal to one, and the component adaptor corresponds to the kernel component; and
- executing, through the kernel component, the kernel component call request to execute processing of a set component function, so that a processing requirement for the to-be-processed blockchain data is satisfied;
- wherein the generating, through the component adaptor, the kernel component call request according to the kernel instruction interface of the kernel component in response to the kernel component interface being called comprises:
- determining, through the component adaptor, the to-be-called kernel component from a kernel component set of a same type according to a kernel component configuration parameter deployed in a blockchain in response to the kernel component interface being called, wherein the kernel component configuration parameter is pre-configured in the component adaptor by a user according to application scenes and business requirements of the blockchain system during a deployment process of the blockchain, and the kernel component configuration parameter comprises a kernel component type selection; and
- generating the kernel component call request according to a kernel instruction interface of the to-be-called kernel component.

13. An electronic device, comprising:
- at least one processor; and
- a memory communicatively connected to the at least one processor;
- wherein the memory stores instructions executable by the at least one processor to cause the at least one processor to perform the method of claim 1.

14. A non-transitory computer-readable storage medium storing computer instructions for causing a computer to perform the method for operating a blockchain system of claim 1.

* * * * *